US008931688B2

(12) United States Patent
Eldefrawy et al.

(10) Patent No.: US 8,931,688 B2
(45) Date of Patent: Jan. 13, 2015

(54) SYSTEM AND METHOD FOR CURRENCY VALIDATION

(75) Inventors: Mohamed Hamdy Khalil Eldefrawy, Riyadh (SA); Muhammad Khurram Khan, Riyadh (SA)

(73) Assignee: King Saud University, Riyadh (SA)

( * ) Notice: Subject to any disclaimer, the term of this patent is extended or adjusted under 35 U.S.C. 154(b) by 128 days.

(21) Appl. No.: 13/611,054

(22) Filed: Sep. 12, 2012

(65) Prior Publication Data

US 2014/0069997 A1 Mar. 13, 2014

(51) Int. Cl.
*G06F 17/00* (2006.01)

(52) U.S. Cl.
USPC .......................................... 235/375; 235/379

(58) Field of Classification Search
USPC .................. 235/375, 379, 380, 382, 487, 492
See application file for complete search history.

(56) References Cited

U.S. PATENT DOCUMENTS 7,221,258 B2 5/2007 Lane et al.
7,606,557 B2 10/2009 Park et al.
7,724,938 B2 5/2010 Pareskevakos
7,750,793 B2 7/2010 Juels
8,022,832 B2 9/2011 Vogt et al.
2012/0224076 A1* 9/2012 Niedermeyer et al. .... 348/211.2
2014/0032396 A1* 1/2014 Sheng et al. .................... 705/39

FOREIGN PATENT DOCUMENTS

CN 101794475 A 8/2010
KR 2006084762 A 7/2006

* cited by examiner

*Primary Examiner* — Karl D Frech
(74) *Attorney, Agent, or Firm* — Lowe Hauptman & Ham, LLP

(57) ABSTRACT

A system and method for currency validation of a bank note with a radio frequency identification device therein utilizes a computer, server and communication link and a smartphone including an RFID reader, transmitter/receiver and an internet connection. A bank note is issued with a value, a serial number and a secret seed message that is also saved on the issuer's server. A tamper proof RFID mu-chip is embedded in the currency note and includes the value, serial number, plus the secret message for making a calculation. The smartphone reads the information on the chip and requests an issuer/authenticator to validate the note. The issuer/authenticator transmits a challenge and the mu-chip calculates an answer that is sent to the issuer/authenticator. An approval or disapproval is then sent to the smartphone.

8 Claims, 4 Drawing Sheets

| RFID mu-chip contains two cells $\gamma$ and $\delta$ | |
|---|---|
| Cell $\gamma$ is un-readable and self-writable | Cell $\delta$ is publicly readable/only writable by $\gamma$ |
| $sd_i(t)$ | $h_B(h_A(sd_i(t)))$ |
| Optical | |
| S | |

SYSTEM AND METHOD FOR CURRENCY VALIDATION

FIELD OF THE INVENTION

This invention relates to a system and method for currency validation and more particularly to a system and method for currency validation using a radio frequency identification device (RFID) embedded therein.

BACKGROUND FOR THE INVENTION

In recent years a number of governments have experimented and tested radio frequency identification devices (RFIDs) as a means for confronting counterfeiting problems. These RFID tags include a tiny microchip that is embedded in currency notes or bank notes to detect and prevent counterfeiting. The RFID chips offer two advantages. First, the chips can perform limited computations and can even interact with a reader and would not need an internal power supply. The chips can be powered by a smartphone's battery. Second, some RFID chips have writable memories and contain the required information to ensure counterfeit verification and the original authentication.

An RFID chip or tag is a tiny device embedded in bank notes that is capable of transmitting over a short distance certain data information. A NFC (near field communication) enabled mu-chip will automatically connect via a near field communications (NFC) enabled Wi-Fi or Bluetooth to the RFID bill tag using the smartphone's integrated lithium batteries power for the tags active operation. NFC standards cover communication protocols, exchange data formats and are based on existing RFID standards including ISO/IEC 14443 and FeliCa3. Further, NFC devices can receive and transmit data simultaneously. Thus, they can provide a collision detection property if the received and transmitted signals frequencies are not matched.

The European Central Bank (ECB) announced the inclusion of RFID tags in all Euro notes above € 20 from February 2007 to improve counterfeit detection and to counter the laundering of Euro bank notes. In the European system, the chip beams a 128 bit code which includes the note's value and serial number to a receiver which in turn uploads the data to the European Central Bank's central database where the tracing and linking algorithms checks aggregate data for suspicious activity.

More recently, Hitachi, the Japanese semi-conductor firm has presented a prototype of its tiny RFID mu-chip which is a microchip with a built-in antenna. An advantage of putting the antenna right in the chip is that it shortens the read range which serves the privacy concerns, in other words to achieve the near field communication criteria. This allows simplified transactions, data exchange and wireless connections between two devices in close proximity to each other.

The U.S. Government is also considering embedding RFID chips in a new one dollar coin in a test to see if the technology can be adapted for larger denominations. The plan calls for inserting the RFID device in a fixed percentage of coins in order to test the feasibility of large scale deployment.

A U.S. Pat. No. 7,221,258 of Lane et al. discloses Hierarchical Electronic Watermarks and Methods of Use. The patent discloses a method and apparatus for authenticating currency wherein the currency contains a substrate such as paper and an embedded RFID transponder. An embedded RFID transponder or electronic watermark may contain multiple hierarchical layers of electronic passwords that are used to electronically protect the host currency from counterfeiting, or unauthorized modification. In addition, such intelligent RFID tags may uniquely identify, a particular document and data relating to the document. The authenticating agency can utilize a public or private Electronic Product Code database as a means for the authenticating agency and third parties to authenticate documents and data in documents. The intelligent interactive Electronic Product Code can be used as an anti-counterfeit mechanism enabling third parties requests to provide services, benefits or monetary payments to authenticate documents and prevent the use of counterfeits.

A more recent U.S. Pat. No. 7,606,557 of Park et al. discloses a mobile communication terminal having a tag read function and method for providing a genuine product authentication service. The mobile communication terminal having the tag read function specifies an encryption key corresponding to an encryption key stored in the tag from its own plurality of encryption keys based on a signal received from the tag. The mobile communication terminal receives an encrypted product code or product information from the tag and decrypts the product code using an encryption key. The mobile communication terminal outputs a result of the encryption on a liquid crystal display (LCD) window or as sounds or voices.

Finally, a U.S. patent of Pareskevakos U.S. Pat. No. 7,724,938 discloses a system and method for intelligent currency validation. As disclosed currency is validated by comparing identifying information extracted from the currency such as a serial number associated with the currency, to identify information in a list corresponding to invalid currency such as counterfeit currency. If the extracted identifying information matches identifying information on the list, the currency is deemed invalid. A photograph or thumb print image can be obtained by a person using the invalid currency to help in later identification of that individual. Optical character recognition techniques can be used to extract the identifying information.

The aforementioned systems and methods offer one approach to preventing the use of counterfeit bank notes using RFID chips, embedded in the currency notes. Nevertheless, it is currently believed that there is a need for an improved system and method in accordance with the present invention. It is believed that there is a need and a potential market because none of the systems known to Applicant detect a counterfeit note with 100% confidence. The duplication in the prior art systems may be difficult, but it is probable that it will be done. Thus there is a need for Applicant's system and method. Another advantage of Applicant's system and method is that an individual can verify a bank note using a smartphone without going to a facility or making personal or direct contact with an agency.

BRIEF SUMMARY OF THE INVENTION

In essence a system for currency validation of a currency note with a radio frequency identification devices (RFID) embedded therein comprises and/or consists of: a computer, a server and a communication channel connected to the computer. The system also comprises or consists of a smart phone including a RFID reader, a radio transmitter/receiver and an internet connection. In the aforementioned system an issuer/authenticator that issues currency notes with serial numbers and tamper proof seed message pairs and wherein the serial numbers and seed messages are saved on the server of and by the issuer/authenticator.

A key element of the present invention resides in a tamper proof RFID mu-chip embedded in a currency note and wherein the chip has 128 bits of storage and includes the value, the serial number of the currency note and its tamper proof seed message. Means are also provided in the smart phone for sending an authentication request over the communication channel to the issuer and/or authenticator. In addition, means for sending a challenge value to the currency note from the issuer/authenticator via the communication channel is sent to the smart phone. Further, the RFID mu-chip calculates a response to a challenge using the currency notes serial number and seed message and via smart phone.

In a preferred embodiment of the invention, the device also calls for means for responding to the smart phone by the issuer/authenticator to authenticate or deny authentication of the currency note. In a preferred embodiment of the invention, the serial number and tamper proof message pairs are in encrypted form before inclusion in the mu-chip in a currency note.

A key element of the present invention lies in the step of requiring the mu-chip on the bank note to do a calculation in response to a challenge that includes a random question. In other words, utilize the zero knowledge evidence function avoiding the use of public key cryptography.

The invention will now be described in connection with the accompanying figures wherein like numbers are used to identify like parts.

DESCRIPTION OF THE PREFERRED EMBODIMENTS OF THE INVENTION

There has been a significant impact by radio frequency identification devices (RFID) mu-chips in counterfeit detection. However, those systems have not provided a 100% confidence level in the accuracy of the systems. The systems, the mu-chip hold a 128-bit storage including the note's serial number which cannot be easily duplicated. However, there is concern that success in duplication of a serial number will lead to mass counterfeiting and failure to detect counterfeit notes.

Figure 1:
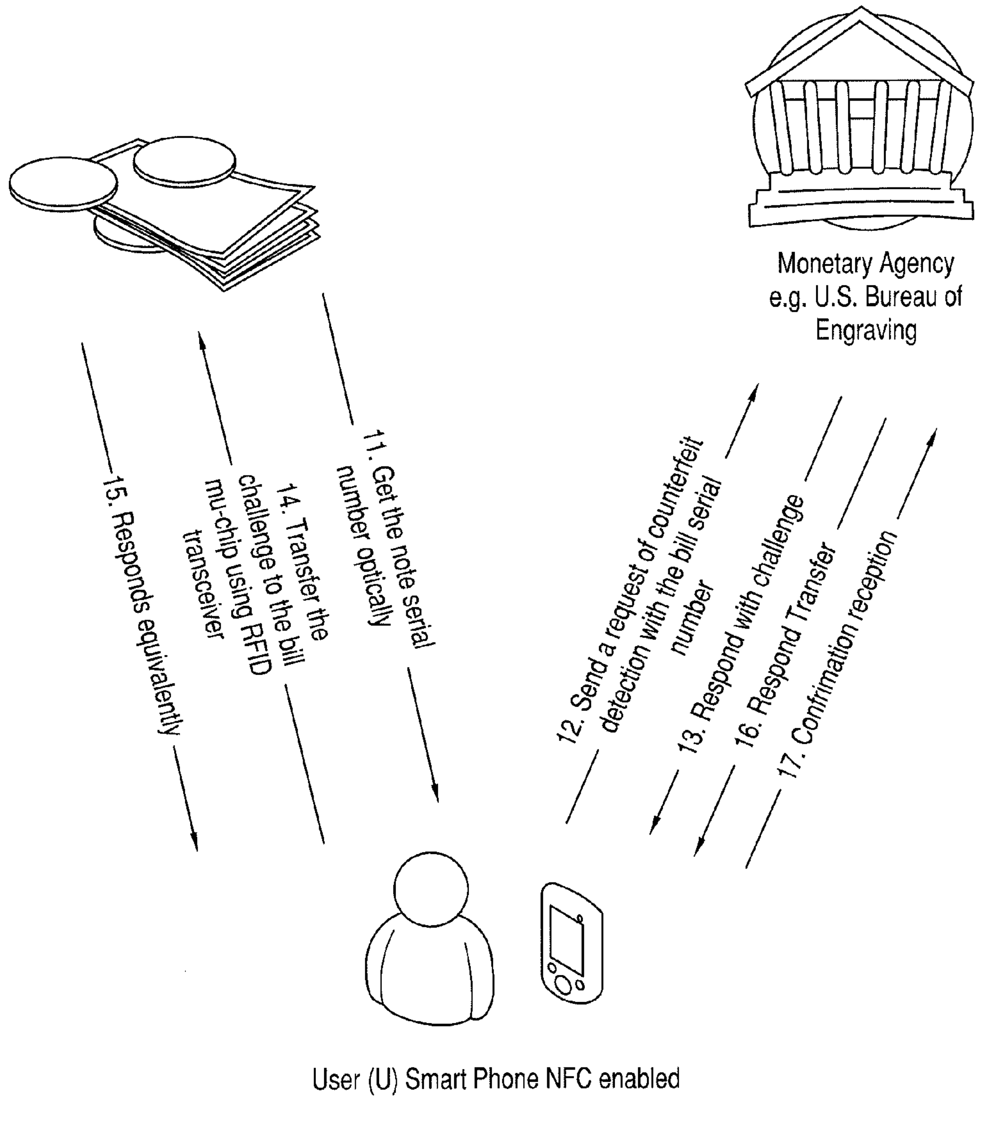
FIG. 1 is a schematic illustration of a proposed counterfeit money/bank note detection system.

The system and method in accordance with the present invention utilizes a radio frequency information device and a smartphone with an RFID reader to verify the authenticity of a bank note or detect a counterfeit with 100% accuracy. Referring to FIG. 1, an issuer/authenticator such as the Bureau of Engraving of the U.S. Treasury issues a series of bank notes, for example twenty dollar bills, each with its own value ($20, $50, $100 etc.), unique serial number and a unique tamper proof seed message in a first step 10. The issuer includes an RFID chip including the value, serial number and seed message that is stored in the issuer's server.

When an individual receives a bank note and wishes to check its validity they use their smartphone to optically read the information on the mu-chip (in message 11) and to automatically send a request to the issuer/authenticator's server with a message 12. The message 12 includes the value of the bill, its serial number and a request for verification. Then the issuer/authenticator's server verifies the value and serial number and if correct corresponds with a random challenge 13 (a third message) that requires a calculation by the mu-chip embedded in the bank note. This message 13, the challenge is sent to the smartphone and transferred to the bank note's mu-chip in message step 14.

In response to the challenge the RFID mu-chip performs a calculation and sends a response to the smartphone, (message 15) that transfers the response to the issuer/authenticator's server with message 16. The server receives and digests the response and if correct sends a confirmation or authentication (message 17) to the smartphone and the individual user (U) seeking authentication. If any of the messages from the RFID mu-chip are incorrect authentication is denied.

Figures 2, 3:
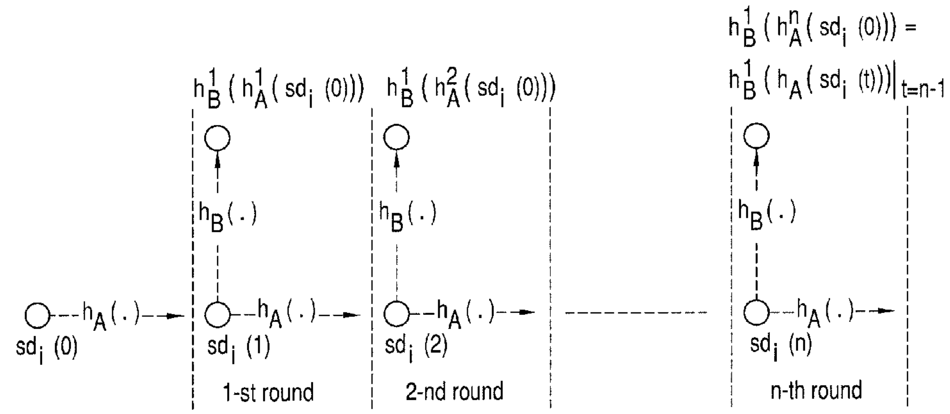
FIG. 2 is a schematic illustration of an internal random function.
FIG. 3 illustrates a bank note data stored format.

An important aspect of the present invention resides in the use of hash functions as described with respect to FIGS. 1-3 and the description thereafter. The following notations have the following meaning:

| Notation | Description |
|---|---|
| U | Denotes a regular user, substituting for M |
| M A | Denotes the Monetary Agency |
| $h(\cdot)$ | Denotes a public cryptographic one way hash function |
| $h_A(\cdot)$ | Represents the first hash function |
| $h_B(\cdot)$ | Represents the second hash function |
| $sd_i$ | The seed initial value for the banknote i |
| $sd_i(t)$ | The seed number t for the t-th authentication (current seed) for the banknote i |

Banknote Creation:

1. M A will attach the banknotes with two RFID μ-Chips (i.e., γ and δ Chips) that contains a tamper proofed value (the bill seed) $sd_i$ and print the bill serial number, optically, on the note. The bill seed and serial number pairs as well as an authentication counter for each note are saved in M A.
2. M A doesn't have any need to sign the note serial number.
3. M A allows the reading/writing capabilities of memory cells as follows: the γ-cell is un-readable and self-writable; the δ-cell is publicly readable and only writable by γ

Banknote Verification:

1. The bill holder U scans the bill serial number optically to satisfy the privacy concern needs (message no. 11).
2. Afterwards he sends an authentication request to M A over a communication channel containing the bill serial number, (message no. 12).
3. M A challenges the RFID mu-chips to produce the next round authentication for the t+1-th authentication values through the user smart phone by:
   Hashing ($sd_i(t)$) by $h_A(\cdot)$ to get $(sd_i(t+1))=(h_A(sd_i(t)))$ and define it for the current seed, and after words hash this current seed by $h_B(\cdot)$ to get $h_B(h_A(sd_i(t)))$ to be transferred to δ cell, (γ)→(δ), which is publicly readable, (messages no. 13 and 14)
4. M A receives the calculated response for the t+1-th authentication and compare it with its own calculated value, (messages no. 15 and 16)
5. Upon the true comparison M A responds with authentication successes process, (message no. 17) Banknote Anonymity:

The δ information $h_8(h_A(sd_i(t)))$, which is publicly readable, can't disclose any acquaintance about the note itself. In each authentication round the corresponding response value has to be changed.

Banknote Tracking:

Hence, the proposed algorithm allow regular and non-specialist users to detect counterfeiting by their smart phone. Then the tracking capability is implicitly and completely archived.

A hash function is an algorithm or subroutine that maps large data sets of variable lengths to smaller data sets of fixed lengths.

Figure 4:
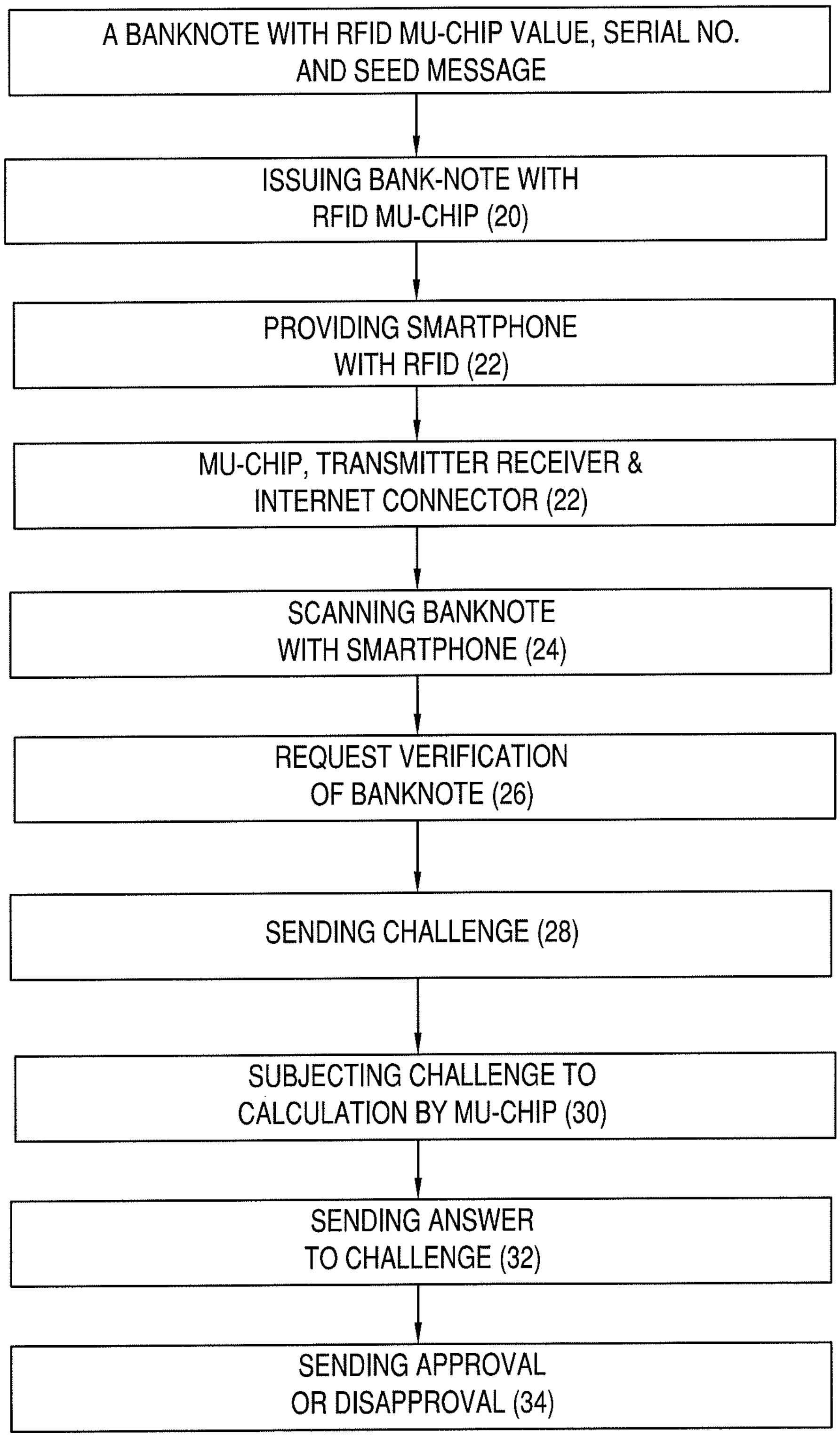
FIG. 4 is a flowchart illustrating the system and method in accordance with the present invention.

A method and system for protecting bank notes with a RFID mu-chip embedded therein and wherein the mu-chip includes a value of the bank note, the serial number of the bank note and a seed method will now be described in connection with FIG. 4. In a preferred embodiment of the invention the seed message may include means for making calculations in response to a series of random questions. The server of an issuer and/or authenticator has the same or an identical means so they can make an identical calculation in order to verify that a response to a challenge is correct and that the bank note is authentic.

As indicated, the system is based on issuing bank notes with a given amount such as $20, $50 or $100 with a serial number and a tamper proof seed message in step 20. The seed message typically includes a number of random questions and a calculation depending on which question is asked. The system also includes a step of providing a smartphone with a RFID reader, transmitter/receiver and internet connector in step 22.

The smartphone is used to scan the bank note or read an RFID signal in step 24 and transmit the information therefrom to an issuer/authenticator's server as a request for authentication in step 26. After verification that the value of the bill and its serial number are valid the server transmits a challenge to the smartphone that requires a calculation by the mu-chip disposed in the bank note. The smartphone forwards the challenge to the mu-chip in step 30.

The mu-chip in the bank note receives the challenge and calculates a response to the random question in the challenge. The individual user receives the answer and forwards the answer to the issuer/authenticator's server in step 32. Assuming the answer is correct i.e., the same as calculated by the server, an approval is sent to the smartphone in step 34. If the answer is incorrect the request for approval is denied.

In this way, the approval is accurate since the mu-chip in the bank note must include the same program as the mu-chip in the original bill. If not, it will not be programmed to calculate a correct answer.

Figure 5:
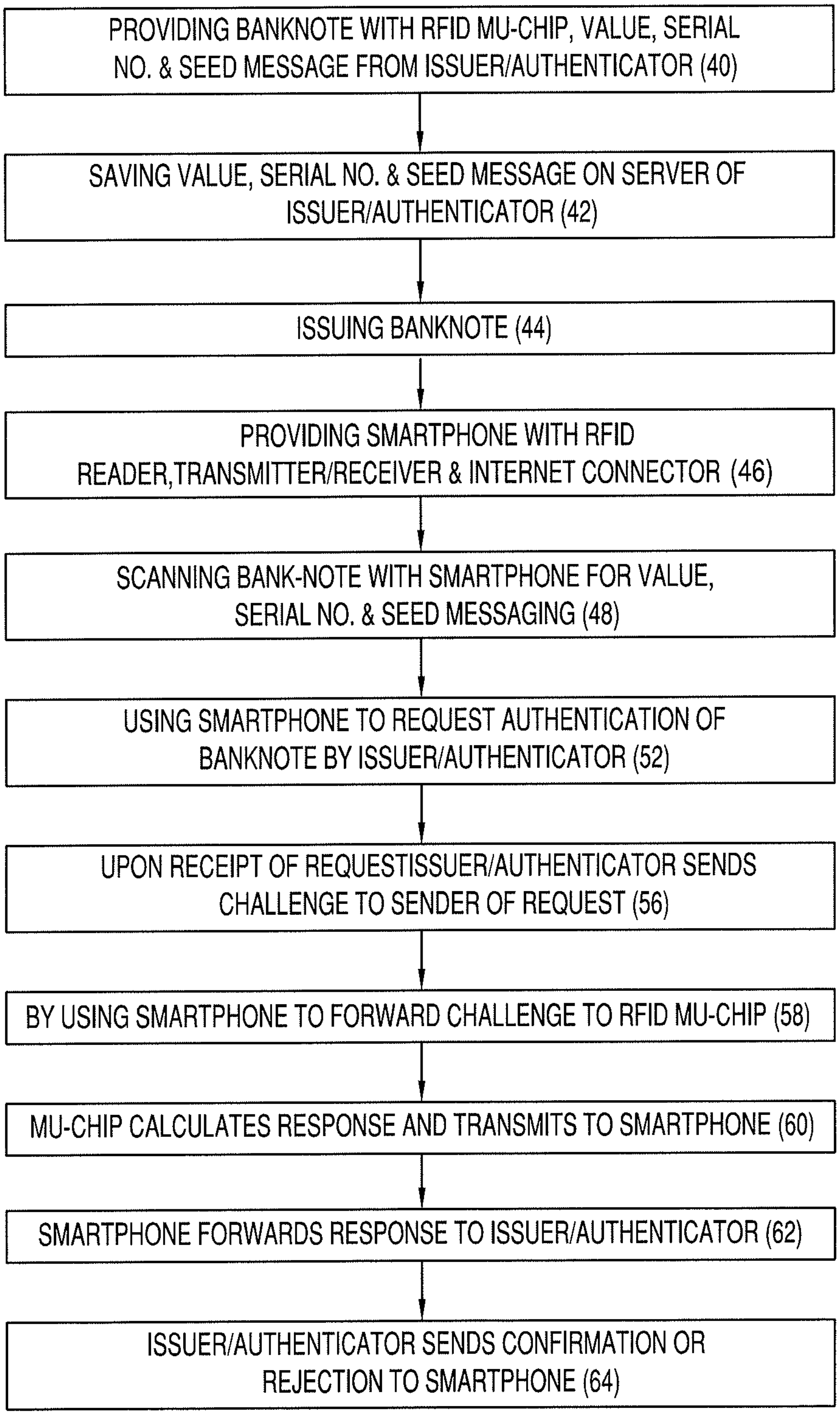
FIG. 5 is a flowchart illustrating the process for verifying a bank note.

As illustrated in FIG. 5, after providing a bank note with a RFID mu-chip, value, serial number and seed message from an issuer/authenticator in step 40, the value, serial number and seed message is preserved on the server of the issuer/authenticator in step 42. At this stage, the bank note is issued in step 44. The method also calls for providing a smartphone with an RFID reader, transmitter/receiver and internet connection in step 46. In the following step 48, the bank note is scanned with the smartphone for detecting its value, serial number and seed message in step 50. Using the smartphone in step 52 the authentication is requested from the issuer/authenticator in step 54. In the next step 56, the server of the issuer/authenticator sends a challenge to the sender of the request. Next, using the smartphone in step 58 the individual seeking authentication forwards the challenge to the RFID mu-chip disposed in the bank note. Then in step 60, the mu-chip calculates the proper response to the challenge and transmits it back to the smartphone which forwards it to the server of the issuer/authenticator in step 62. Finally, assuming each of the steps has been correctly answered the issuer/authenticator sends the confirmation to the requester's smartphone in step 64.

While the invention has been disclosed in connection with its preferred embodiments it should be recognized that changes and modifications may be made therein without departing from the scope of the claims.

What is claimed is:

1. A system for currency validation of a currency note with a radio frequency identification device (RFID) embedded therein, said system comprising:

- a computer, a server and a communication channel connected to said computer;
- a smart phone including a RFID reader, a radio transmitter/receiver and an internet connection;
- an issuer/authenticator that issues currency notes with a value, a serial number and tamper proof seed message and wherein said serial numbers and said seed messages are saved on said server of and by said issuer/authenticator;
- a tamper proof RFID mu-chip embedded in a currency note and wherein said chip has 128 bits of storage and includes the value, the serial number of the currency note and its tamper proof seed message;
- means including said smart phone for sending an authentication request over said communication channel to said issuer/authenticator's server;
- means for sending a challenge value to the currency note from said issuer/authenticator via said communication channel and said smart phone; and
- means including said RFID mu-chip for calculating a response to a challenge using the currency note's serial number and seed message and said smart phone.

2. A system for currency validation of a currency note with a radio frequency identification device (RFID) embedded therein according to claim 1, which includes:

- means for responding to said smart phone by said issuer/authenticator to authenticate or deny authentication of said currency note.

3. A system for currency validation of a currency note with a radio frequency identification device (RFID) embedded therein according to claim 2, in which said mu-chip calculates a response to a challenge received from said issuer/authenticator and using said smart phone sends a response to said issuer/authenticator.

4. A system for currency validation of a currency note with a radio frequency identification device (RFID) embedded therein according to claim 1, in which said serial number and said tamper proof message pairs are in encrypted form before inclusion in said tamper proof mu-chip in a currency note.

5. A system for currency validation of a currency note with a radio frequency identification device (RFID) embedded therein, said system consisting of:

- a computer, a server and a communication channel connected to said computer;
- a smart phone including a RFID reader, a radio transmitter/receiver and an internet connection;
- an issuer/authenticator that issues currency notes with a value, serial number and a tamper proof seed message and said seed message is saved on said server of and by said issuer/authenticator;
- a tamper proof RFID mu-chip embedded in a currency note and wherein said chip has 128 bits of storage and the value, serial number of the currency note and its tamper proof seed message;
- programming means included in said smart phone for reading the serial number of a currency note and sending an authentication request over said communication channel to said issuer/authenticator;
- means for sending a challenge value to the currency note from said issuer/authenticator via said communication channel and said smart phone;

means including said RFID chip for calculating a response to a challenge using the currency note's serial number and seed message and said smart phone; and means for responding to said smart phone by said issuer/authenticator to authenticate or deny authentication of said currency note.

6. A system for currency validation of a currency note with a radio frequency identification device (RFID) embedded therein according to claim 5, in which the RFID mu-chip contains two cells and wherein a first of said two cells is readable and self-writable while a second of said cells is publicly readable and only writable by a first of said cells.

7. A method for validating currency notes with a radio frequency identification device (RFID) embedded therein, said method comprising the steps of:

providing a computer, a server and a communication channel connected to said computer;

issuing a series of bank notes each of which has an RFID mu-chip with 128 bits of storage embedded therein with a value, a serial number and a tamper proof seed message capable of doing a calculation in response to a challenge from a random question;

saving said value, serial number and said seed message on said server of an issuer/authenticator;

providing a smartphone with a RFID reader, receiver/transmitter and an internet connection;

scanning a bank note with said smartphone and forwarding a request to an authenticator for authentication of the bank note;

receiving a challenge on said smartphone in response to said request;

transferring said challenge to said mu-chip in the bank note;

completing a calculation in response to a random question in said challenge and transferring the answer to said reader in said smartphone;

forwarding said answer from said smartphone to said server of said issuer/authenticator; and receiving verification or denial of verification from said server on said server if the answer is correct or incorrect, respectively.

8. A method for validating currency notes with a radio frequency identification device (RFID) embedded therein, said method consisting of:

providing a computer, a server and a communication channel connected to said computer;

issuing a series of bank notes each of which has an RFID mu-chip with 128 bits of storage embedded therein with a value, a serial number and a tamper proof seed message capable of doing a calculation in response to a challenge from a random question;

saving said value, serial number and said seed message on said server of said issuer/authenticator;

providing a smartphone with a RFID reader, receiver/transmitter and an internet connection;

scanning a bank note with said smartphone and forwarding a request to an authenticator for authentication of the bank note;

receiving a challenge on said smartphone in response to said request;

transferring said challenge to said mu-chip in the bank note;

completing a calculation with said mu-chip in response to a random question in said challenge and transferring the answer to said reader in said smartphone;

forwarding said answer from said smartphone to said server of said issuer/authenticator; and receiving verification or denial of verification from said server on said server if the answer is correct or incorrect, respectively.

* * * * *